United States Patent [19]

Backenstow et al.

[11] Patent Number: 4,849,268

[45] Date of Patent: Jul. 18, 1989

[54] LAP SEAM FOR LIQUID CONTAINMENT SYSTEMS AND METHOD OF FORMING

[75] Inventors: Don E. Backenstow; Daniel J. Cotsakis; Laura E. Gish, all of Carlisle, Pa.

[73] Assignee: Carlisle Corporation, Cincinnati, Ohio

[21] Appl. No.: 204,925

[22] Filed: May 5, 1988

Related U.S. Application Data

[63] Continuation of Ser. No. 18,452, Feb. 25, 1987, abandoned.

[51] Int. Cl.⁴ ............................................. B32B 3/06
[52] U.S. Cl. ...................................... 428/57; 156/71; 156/157; 156/314; 428/194; 428/214; 428/447; 428/448; 428/521
[58] Field of Search ................... 156/71, 157, 295, 310, 156/314; 428/57, 58, 194, 447, 448, 516, 521, 523, 214

[56] References Cited

U.S. PATENT DOCUMENTS

| | | | |
|---|---|---|---|
| 2,624,886 | 1/1953 | Herman | 428/57 |
| 3,578,543 | 5/1971 | Cook et al. | |
| 3,716,434 | 2/1973 | Cook et al. | |
| 3,918,233 | 11/1975 | Simpson . | |
| 4,038,804 | 8/1977 | Haage et al. | |
| 4,054,703 | 10/1977 | Boehm . | |
| 4,192,116 | 3/1980 | Kelly . | |
| 4,239,795 | 12/1980 | Haage et al. | |
| 4,296,582 | 10/1981 | Simpson et al. | |
| 4,303,712 | 12/1982 | Woodroof | 428/58 |
| 4,421,581 | 12/1983 | Olsen . | |
| 4,501,842 | 2/1985 | Chmiel et al. | |
| 4,525,400 | 1/1985 | Surprenant | 428/58 |
| 4,535,015 | 8/1985 | Bruner et al. | 428/58 |
| 4,568,588 | 2/1986 | Fujiki et al. | 428/57 |
| 4,588,637 | 5/1986 | Chiu . | |
| 4,589,804 | 5/1986 | Paeglis et al. | 428/57 |
| 4,601,935 | 7/1986 | Metcalf et al. | |
| 4,654,098 | 3/1987 | Miller | 156/157 |
| 4,668,315 | 5/1987 | Brady et al. | 156/71 |
| 4,671,975 | 6/1987 | Smialowicz | 428/57 |

FOREIGN PATENT DOCUMENTS 195614 12/1982 Japan ............................... 156/157

Primary Examiner—Michael Wityshyn
Attorney, Agent, or Firm—Wood, Herron & Evans

[57] ABSTRACT

A membrane type liquid containment system such as a membrane roof, pond liner and the like is disclosed wherein a large membrane is formed by adhering together individual membrane sheets at lap seams or field splices. The field splice includes a primary adhering seal formed by a splicing cement. The splice also includes a thick bead of a sealant applied between the overlapped edges. This seal acts to form a secondary or redundant seal in the field splice whereby any failure in the splicing cement or primary bond does not cause failure. A method of forming this seal is also described which permits application of the lap sealant after the cement has been applied while the cement is developing body or strength.

14 Claims, 2 Drawing Sheets

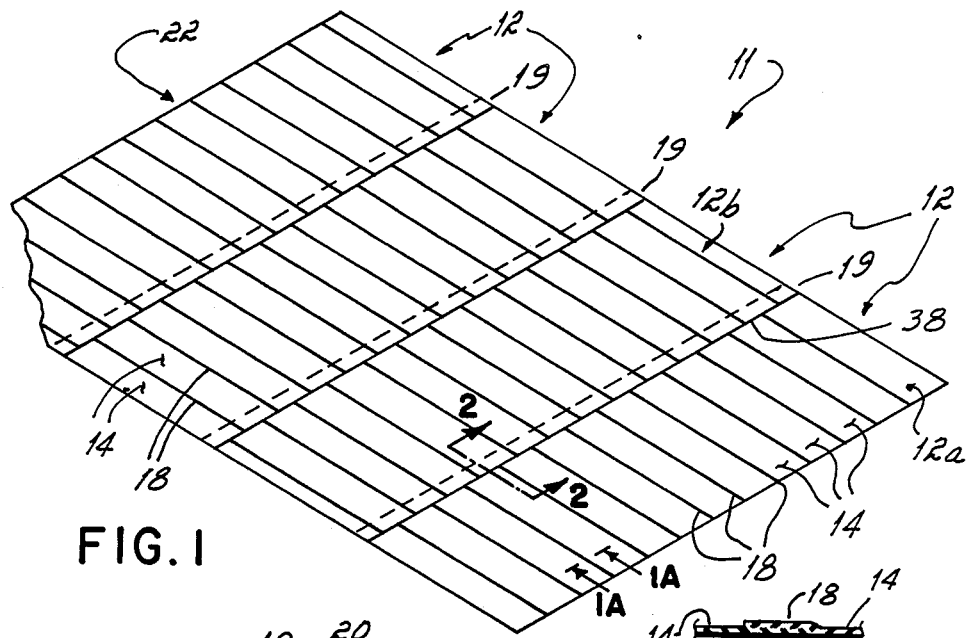
FIG. 1
FIG. 1A
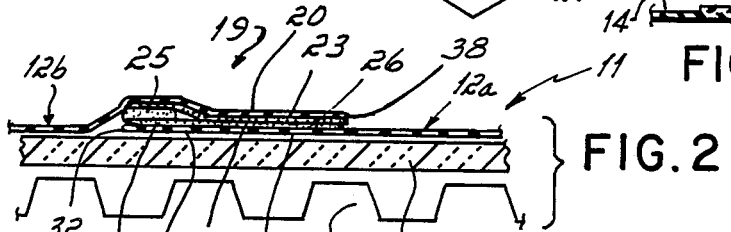
FIG. 2
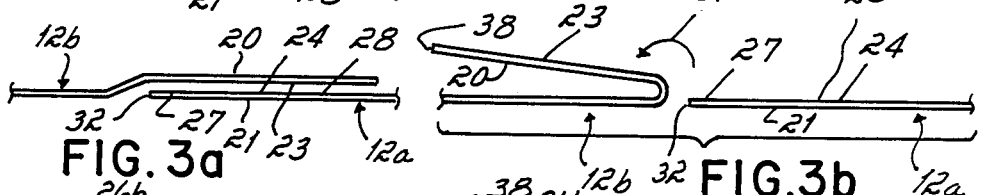
FIG. 3a  FIG. 3b
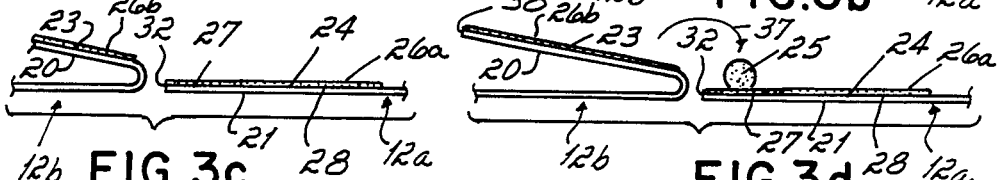
FIG. 3c  FIG. 3d
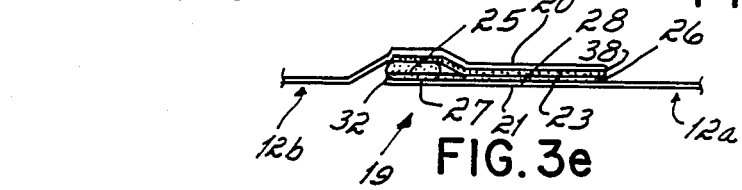
FIG. 3e

LAP SEAM FOR LIQUID CONTAINMENT SYSTEMS AND METHOD OF FORMING

This application is a continuation of application Ser. No. 018,452 filed Feb. 25, 1987, now abandoned.

BACKGROUND

The present invention relates to liquid containment systems such as membrane roof systems, pond liners and storage tank liners. More particularly the present invention relates to field splices or lap seams in liquid containment systems and the method of forming these field splices.

Membrane type liquid containment systems include a membrane which is fluid tight, covering the entire system to prevent liquid from penetrating, for example through the roof deck and into the building or into the ground from a pond. Membranes which are about fifty feet wide and two to three hundred feet in length can be formed in a factory. However, due to manufacturing difficulties the width (50 feet) cannot be substantially increased. Where a roof, pond or the like is larger than fifty feet wide, it is necessary to form the membrane by adhering two or more factory produced membranes together at overlapped edges or seams. These are typically referred to as field splices.

A field splice is formed by bonding together overlapping edges of adjacent membranes, i.e., the lower surface of an edge of a first membrane is bonded to the upper surface of an edge of a second membrane. The field splice, which is about three to twelve inches wide, generally includes a thin layer of an internal splicing adhesive or cement which provides a strong secure bond between the two sheets. In the past, water sensitive splicing cements were prevalent. However, non-water sensitive cements are also used. In order to protect the splicing cement from moisture and to seal any capillaries or other gaps in the splice, a lap sealant is applied to the exterior of the field splice at the outer exposed edge of the upper membrane.

Forming these field splices requires a multi-step process. First the upper and lower edges of the two membranes to be spliced are cleaned to remove talc or other building site foreign material. The splicing cement is then applied to about six inches of both the top and bottom edges of the two membranes. This is allowed to dry for a period of about 5 to 30 minutes during which time the solvent evaporates and the adhesive develops body or strength. This is required to provide sufficient bond tack or greater strength to ensure bonding. Otherwise, the edges could become separated before the adhesive sets and there could be a field splice failure. After the adhesive has partially dried, the upper edge is pressed against the lower edge. A lap sealant is then applied to the exterior exposed side edge of this field splice.

This method of forming a field splice although widely accepted in the elastomeric membrane industry has several disadvantages. The first and primary disadvantage is that the lap sealant is exposed to the elements. Field splices are typically designed to last at least fifteen years. The lap sealants which can withstand weather for fifteen years are expensive.

Further, the lap sealant may be separated from the field splice if stepped on or subjected to force. Because of the location, the lap sealant simply lying against the field splice may not have the ability to form a good physical bond. Should the lap sealant fail, a leak is likely to develop where the splicing cement did not form a perfect seal.

There are various reasons why the splicing cement will not form a perfect seal. When large elastomeric membranes are formed at the factory, they are formed by splicing together through heat and vulcanization even smaller membranes. (For example, twenty (10'×50') membranes can be bonded together to form one membrane which is 200 feet long and 50 feet wide). Where two of the 10'×50 membranes are vulcanized together, there is an enlarged cross-section or factory seam. Because such a thin film of splicing cement is applied in the field, it frequently does not fill in the gaps created where the field splice includes a factory seam. This is particularly true if two factory seams are overlapped.

Also, when these field splices are formed, pressure is required to force the two edges together to make a good bond. Any irregularity in the supporting structure will prevent a uniform application of pressure across the entire seam. This can cause gaps. Further, if the membranes are not perfectly aligned, an edge can pucker and create a gap. Finally, simply because such a thin film of cement is used, capillaries can form which will allow the passage of water.

In addition to these problems with the integrity of the field splice, the very method of forming the field splice presents disadvantages. Specifically it is very time consuming. The splicing cement which is applied to the outer edges of the membranes must be allowed to partially dry before the upper membrane can be pressed down against the lower membrane. Otherwise, the adhesive will not have sufficient bond tack to initially hold the membranes together. This means the applicator forming the field splice must wait while the cement is drying. This is a significant waste of manpower.

Systems have been designed to overcome these problems. One such system, for example, is disclosed in Kelly U.S. Pat. No. 4,192,196 which describes a complicated roofing system using multiple layers of splicing cement and exterior superficial protective layers. This method is complicated and expensive and therefore unacceptable for current liquid containment systems.

Other systems include snap fitting sheets such as Simpson et al, U.S. Pat. No. 4,296,582. Such interlocking systems are excessively expensive to manufacture and accordingly unsuitable for use in current roofing systems. Further, Cook U.S. Pat. No. 3,716,434 discloses a thermoplastic bonding material which includes application of multiple beads of hot melt. This method calls for application of excessive amounts of hot melt and requires application of a molten hot adhesive to a thermoplastic material. Hot melt adhesives set too quickly and are unsuitable for most roofing applications. To form a bond, the edges must be pressed against the hot melt before it cools. To date, this has proved to be impractical for field application.

SUMMARY OF THE INVENTION

Accordingly, it is an object of the present invention to provide a reliable field splice for a membrane type containment system which includes a thin film of adhesive for providing a strong primary seal and an internal bead of sealant to prevent leakage.

Further it is an object of the present invention to provide such a field splice wherein the sealant provides a backup or redundant liquid seal.

Further, it is an object of the present invention to provide a field splice wherein the sealant is protected from the elements in such a manner that good physical adhesion by the sealant to either the uncoated membrane or splicing cement is provided and wherein the sealant is protected from external forces.

It is also an object of the present invention to provide a field splice wherein the sealant significantly improves the field seam strength and reduces the probability of an error that may cause a leak.

Further, it is an object of the present invention to provide an improved, faster method of forming a field splice.

The present invention is premised on the realization that an improved field splice can be formed wherein the splice includes a bead of lap sealant between the overlapped edges of the field splice with a thin wide film of non-water sensitive splicing cement also located between the overlapped edges.

This provides a field splice which uses the lap sealant as an internal or redundant liquid seal. The lap sealant acts as a stopper to prevent liquid that may pass through the primary seal from leaking through the field splices. It also fills gaps and irregularities in the field splice. Placing the lap sealant internally of the field splice, protects it from weather and external forces. Further it reduces the time required to form a field splice because the lap sealant can be applied to the field splice while the splicing cement is drying.

Further by employing a sealant which also crosslinks and acts as an adhesive improves bond strength and prevents failure should the field splicing cement fail.

The method of forming this field splice reduces application time because the sealant can be applied to the splice while the splicing cement is developing body or strength.

These and other advantages will be appreciated further in light of the following detailed description and drawings in which:

BRIEF DESCRIPTION OF DRAWINGS

FIG. 1 is perspective view of a roof made according to the present invention.

FIG. 1A is a diagrammatic cross section taken at line 1A—1A of FIG. 1;

FIG. 2 is a diagrammatic cross section partially broken away taken at lines 2—2 of FIG. 1;

FIG. 3a–3e are diagrammatic depictions in cross-section showing the method of forming a field splice according to the present invention.

DETAILED DESCRIPTION

Figure 4A:
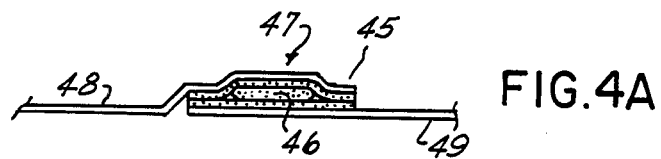
FIG. 4A and 4B are diagrammatic depiction in cross-section of alternate embodiments of the present invention.

The present invention is a unique field splice which can be used to form large membranes by adhering together smaller membranes. These membranes can be used in many different applications including membrane roofs, pond, liners, liquid storage tank liners and the like. The present invention is particularly described with particular reference to a roof system.

As shown more particularly in FIGS. 1 and 2, there is a roof system 11 which is formed from a plurality of elongated membranes 12 of rubber. These membranes cover an insulation layer 16 which in turn rests on a deck surface 17. These membranes are typically about ten to fifty feet wide and up to two or possibly three hundred feet in length depending on the requirements of the particular job. These membranes 12 which are manufactured in a factory are in turn formed from long, narrow membranes 14 (i.e. 10'×50') which are vulcanized together at overlapped edges or factory splices shown as 18. As shown in FIG. 1A, these factory splices 18 have a stepped cross-sectional configuration which create an irregular surface along edges of these membranes. The membranes 12 are bonded together at field seams or field splices 19 to form one continuous larger membrane 22 which acts to cover the entire roof 11.

This membrane 22 is held to the roof deck by ballast, mechanical fasteners, adhesive or a combination of these. Since the particular means by which the membrane is held to the deck is not part of the present invention, it is not shown in these drawings. Any method of attachment can be used depending on cost and the intended wind rating of the roof.

As shown more particularly in FIG. 2, field splice 19 bonds first membrane 12a to second membrane 12b. Specifically a lower surface 23 of one edge 20 of the second membrane 12b is bonded to an upper surface 24 of one edge 21 of the first membrane 12a.

The field splice includes a two element bonding system. The first element is a thick internal bead of lap sealant 25; and the second element is a wide thin layer of splicing cement 26. The splicing cement covers lower surface 23 and upper surface 24 of edges 20 and 21. The lap sealant 25 as shown lies on the innermost portion 27 of the seam 19.

The lap sealant 25 must have a thickness effective to bridge gaps typically encountered in field splices. For this purpose, it should be generally about 1/16 to $\frac{1}{2}$ of an inch in diameter as applied preferably 1/16 to $\frac{1}{4}$ inch. When compressed, it will increase in horizontal width but decrease in vertical thickness. The sealant even after compression remains substantially thicker than the splicing cement and generally at least two to three times and generally 5 to 10 times as thick as the dry splicing cement.

The lap sealant can be formed from a variety of different curing and non-curing compositions such as EPDM based caulking compounds, butyl based caulking compounds and silicone caulking compounds such as those purchased from Dow Corning and sold under the brand name Dow Corning 799. Preferably a 100% solids sealant is applied to avoid problems which may be encountered by leaching of the solvent into the adhesive layer.

The sealant, splicing cement and membrane must be compatible to form a strong adhesive bond. If they are incompatible, the sealant could separate from the cement and the sealant would fail or the sealant could separate from a non-cemented surface and then the sealant could fail.

The sealant when applied has substantially more body than the splicing cement when applied and does not flow without being subjected to a moderate force. It is preferably a non-sag sealant having a sag of less than one (1) inch and preferably less than one-half ($\frac{1}{2}$) inch when measured according to ASTM D2202.

Further, the lap sealant itself should be an adhesive, i.e., develop adhesive strength. Generally the peel strength developed by the sealant within the lap seam should be about four (4) pounds per linear inch at 20° C. and 1 pound per linear inch at 70° C. Most preferably, the sealant should be cross-linkable, i.e., a thermoset material so that it does not significantly soften at elevated temperatures. The sealant should flow and wet the surface when applied, permitting it to bond to even dusted surfaces. This provides a back-up should there be an applicator's error.

The splicing cement will generally cover an area of the seam having a horizontal width (cross-section) of 3-6 inches and preferably 4 inches. The vertical thickness of the layer of cement generally is from about 8-20 mils preferably about 10 mils for normal roofing purposes. The splicing cement should be a cement which is insensitive to moisture. Suitable water insensitive adhesives are butyl based adhesives such as are described in U.S. Pat. No. 4,501,842. The disclosure of this patent is incorporated herein by reference. A commercially available butyl based adhesive is Uniroyal M6365. These butyl based adhesives are compatible with selected silicone sealants. The splicing cement provides most of the initial bond strength because the sealant has relatively little green strength when applied.

Also, butyl splicing tapes such as those disclosed in U.S. Pat. Nos. 4,588,637 and 4,601,935 are suitable for use in the present invention. When a splicing tape is employed, the sealant is applied to an area not covered by the tape.

The field splice of the present invention is formed as shown in FIGS. 3a–3d. In the initial step, the first membrane 12a is laid down on a roof or other supporting structure such as a pond bottom. The second membrane 12b is then laid down in alignment with the first membrane 12a so that the edge 20 of the membrane 12b overlaps the edge 21 of membrane 12a. The edge 20 of the second membrane is then pulled back over as indicated by arrow 31 exposing the lower surface 23 of membrane 12b and the upper surface 24 of membrane 12a.

The lower surface 23 and upper surface 24 are then cleaned with a solvent such as heptane or a solvent primer to remove talc or other dust which is typically applied to the membrane at the factory or may accumulate on the membrane during field installation.

The entire area of surfaces 23 and 24 can then be primed by application of a coating of a primer designed for the particular adhesive. The primer is not required and can vary depending on job or adhesive system used. Four to ten dry mil thick layers of splicing cement 26a and 26b are applied to upper and lower surfaces 23 and 24. (In certain applications, only one layer of splicing cement need be applied).

After the adhesive layers 26a and 26b are applied, a ¼-1/16 inch bead of lap sealant 25 is applied to innermost portion 27 of lower surface 24 over adhesive layer 26a. Edge 20 is then folded back onto edge 21 as indicated by arrow 37 and finally, the surface 23 is pressed down by means of a roller or the like against the surface 24. This compresses the lap sealant as well as the layers of splicing cement. The layers of splicing cement bond to each other forming one wide, thin layer of adhesive between the overlapped edges.

In this construction the upper edge protects the lap sealant from the physical elements as well as external forces such as those encountered when someone walks across a roof. Further, since the sealant is actually between two membranes, it provides for a better physical bond. The splicing cement still acts to provide sufficient bonding strength to maintain a reliable long lasting field splice.

Optionally an external lap sealant 39 can be applied exterior of the field splice against the extreme outer side 38 of sheet 12b. This would provide added protection. This lap sealant would have to be weather resistant and basically be any lap sealant currently used.

Figure 4B:
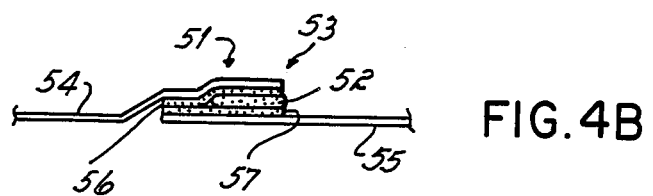

The present invention can be modified by altering the location of the sealant within the seam as shown in FIGS. 4A and 4B, the sealant can be located anywhere within the seam.

FIG. 4A shows a seam 45 with the sealant 46 located in a central portion 47 of the seam. Splicing cement layers 48 and 49 cover the entire width of the seam.

FIG. 4B shows a seam 51 where a bead of sealant 52 is located at an outermost portion 53 of the seam but still substantially between membranes 54 and 55. Again, splicing cement layers 56 and 57 cover the entire width of the seam. Further, the lap sealant could be positioned to contact the membranes directly as opposed to contacting the splicing cement.

As previously stated the present invention was particularly described with respect to a membrane roof system. This is the embodiment where an external sealant is likely to be subjected to external forces and where leakage would generally be most damaging. However, the present invention can also be employed in the manufacture of pond liners, liquid storage tank liners and generally any liquid containment systems.

While the foregoing disclosure and description of the invention is illustrative and explanatory thereof other modifications will be apparent to those skilled in the art.

Therefore, the present invention is limited only in scope by the appended claims wherein we claim:

1. A liquid tight field splice comprising a first edge of a first membrane sheet overlapped onto a second edge of a second membrane sheet;
   a bead of sealant between said overlapped edges lying along the entire length of said overlapped edges, said sealant having a sag less than about 1 inch;
   a thin layer of a thermoset adhesive between said overlapped edges, said layer being at least about 3 inches wide and having a thickness;
   said bead of sealant having thickness effective to bridge minor gaps in said field splice wherein said bead of sealant has a thickness at least 5 times the thickness of said layer of adhesive.

2. The field splice claimed in claim 1 wherein said bead of sealant is at an innermost portion of said field splice.

3. The field splice claimed in claim 1 wherein said first edge of said first membrane and said second edge of said membrane are primed edges.

4. The field splice claimed in claim 1 further comprising a lap sealant at an exterior portion of said field splice.

5. The field splice claimed in claim 4 wherein said bead of sealant is a silicone sealant.

6. The field splice claimed in claim 1 wherein said adhesive layer is a butyl adhesive.

7. The field splice claimed in claim 1 wherein said adhesive layer is a splicing tape.

8. The field splice claimed in claim 1 wherein said bead of sealant is an adhesive.

9. The field splice claimed in claim 8 wherein said bead of sealant is a crosslinking adhesive.

10. The field splice claimed in claim 1 wherein said bead of sealant is a 100% solid sealant.

11. The field splice claimed in claim 1 wherein said bead of sealant is adhered to said thin layer of adhesive.

12. The field splice claimed in claim 1 wherein said bead of sealant develops a peel strength of at least 4 pounds per linear foot at 20° C.

13. The liquid tight field splice claimed in claim 1 wherein said thin layer of a thermoset adhesive has a thickness of from about 8 to about 20 mils.

14. The liquid tight field splice claimed in claim 13 wherein said adhesive layer is less than about 6 inches wide.

* * * * *